June 5, 1934.  W. L. DE BAUFRE  1,961,203
APPARATUS FOR SEPARATING MIXED GASES BY SELECTIVE LIQUEFACTION
Original Filed March 17, 1932
Section a-a
Fig. 2.
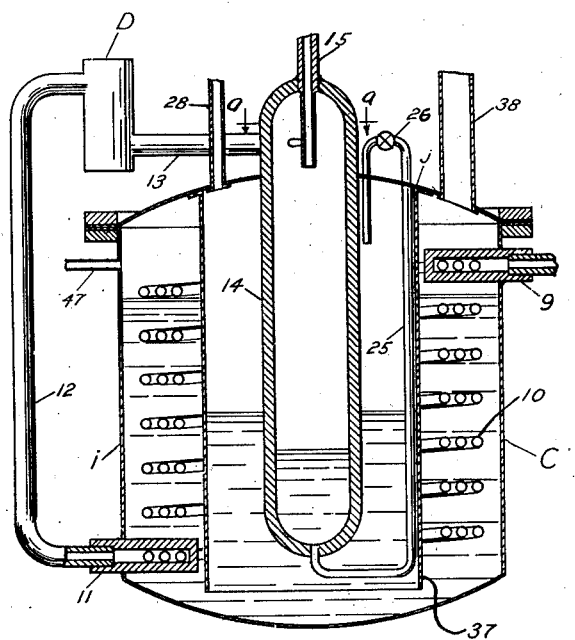
Fig. 1.
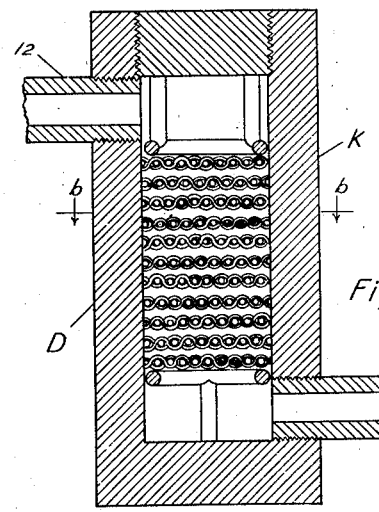
Fig. 3.
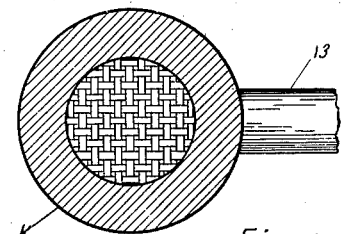
Section b-b  Fig. 4.
Wm. L. De Baufre INVENTOR Patented June 5, 1934

1,961,203

UNITED STATES PATENT OFFICE 1,961,203

APPARATUS FOR SEPARATING MIXED GASES BY SELECTIVE LIQUEFACTION

William Lane De Baufre, Lincoln, Nebr.

Original application March 17, 1932, Serial No. 599,475. Divided and this application August 30, 1932, Serial No. 631,044

11 Claims. (Cl. 62—122)

This invention relates to improvements in the art of separating mixed gases and is especially useful in the purification of helium containing nitrogen, oxygen and other gases having much higher boiling points than helium.

The primary object of the invention is to secure helium of a higher purity than has heretofore been obtained by the liquefaction process.

The above object together with such other advantages as may hereinafter appear or are incident to the invention, are realized by the apparatus which I have illustrated in a preferred form in the accompanying drawing, wherein:

Fig. 1 is an elevation partly in cross-section of the improved part of the apparatus;

Fig. 2 is a detail cross-section of the flask in Fig. 1;

Fig. 3 is an elevation in cross-section of the mist collector D in Fig. 1;

Fig. 4 is a plan view in cross-section of mist collector D.

The process is described and claimed in application No. 596,289, filed March 2, 1932.

This patent application is a division of application No. 599,475, filed March 17, 1932, wherein the complete apparatus for purifying helium was described and claimed.

Referring to Fig. 1, impure helium under a pressure of say 1500 to 3000 lbs. per sq. in. and cooled to 100 Kelvin or less enters manifold 9 and flows down through tubes 10 to manifold 11. Within tubes 10, the impure helium is further cooled by heat transfer to the liquid surrounding these tubes, so that the impure helium leaves through pipe 12 at a temperature around 75 Kelvin. At this very low temperature, most of the impurities are liquefied and a portion exists as mist in the helium gas. The helium gas containing this mist is passed through mist collector D where most of the mist is concentrated into liquid drops. The helium gas containing liquid drops of impurities and any remaining mist enters flask 14 through pipe 13. In flask 14, nearly complete separation occurs of all liquefied impurities from the helium gas. The purified helium gas leaves flask 14 through pipe 15.

The liquefied impurities accumulated in flask 14 contain a small amount of helium gas by absorption. These impurities, together with the absorbed helium gas are discharged through pipe 25 and throttle valve 26. They are throttled from the pressure of 1500 to 3000 lb. per sq. in. within flask 14 to say 22 lb. per sq. in. in the annular space surrounding the lower portion of flask 14. At the low pressure after throttling, most of the absorbed helium gas is released. A small portion of the liquefied impurities is evaporated by the throttling action. The absorbed helium gas released and the liquid evaporated by throttling accumulate in the top of the annular space surrounding flask 14 and depress the liquid level in this annular space. The mixture of helium gas released and saturated vapor formed by throttling the liquefied impurities, is withdrawn from the circular space surrounding flask 14 through pipe 28.

The liquefied impurities at a temperature of about 75 Kelvin from the inner compartment immediately surrounding flask 14, are forced down under partition 37 and rise in the outer compartment, flowing up over tubes 10. Heat transfer from the impure helium within tubes 10 first raises the temperature of the liquefied impurities to the temperature of vaporization corresponding to the pressure in the outer compartment and then vaporizes the liquid at this temperature. If the pressure in the outer compartment is say 22 lb. per sq. in., the temperature of vaporization will be over 80 Kelvin, the exact value depending upon the composition of the impurities.

At starting and whenever it is desirable to augment the liquid within the outer compartment, liquid air or other suitable refrigerant is introduced through pipe 47. This liquid air then commingles with the liquefied impurities separated from the helium and the commingled liquids are vaporized by heat transfer from the impure helium within tubes 10. The vapor leaves through pipe 38.

In mist collector D, a number of wire mesh screens are used as shown in Fig. 3 and Fig. 4 in order to provide a large amount of surface to be wetted by the liquefied impurities in the helium and to insure that most of the mist will come into contact with this surface. This action concentrates the mist into liquid drops.

Pipe 13 conveying the helium gas, liquid drops of impurities and any mist remaining as such, enters flask 14 tangentially, see Fig. 2, in order to produce a whirling, or cyclonic, motion within the flask. As a result of the whirling motion, the liquid drops and the mist are thrown by centrifugal force to the periphery of the whirling mass of gas so that the liquid collects on the inner wall of the flask and flows down to the bottom thereof. The centrifugal action is thus not only effective in separating liquid drops of impurities from the helium gas but also in removing any mist of impurities remaining therein after passing through the mist collector. While the mist collector and the cyclone separator are together more effective in removing the liquefied impurities from the helium gas than either would be separately, each has a certain degree of effectiveness without the other.

The arrangement of compartments surrounding flask 14 was adopted in order to maintain the liquefied impurtities thrown by centrifugal force upon the inner walls of flask 14 at the lowest possible temperature. There is therefore no tendency for the liquefied impurities within flask 14 to vaporize and thus reduce the purity of the helium gas from which they had previously been separated. Such vaporization not only adds these impure vapors to the purified helium but also tends to add thereto some mist of the liquefied impurities produced by boiling of the liquefied impurities.

The lowest possible temperature is reached in the annular compartment immediately surrounding flask 14 by protecting the liquefied impurities therein from heat leak by surrounding this compartment by another annular compartment at nearly the same temperature. Any heat leak into the inner annular compartment would vaporize some of the liquefied impurities and thereby add to the partial pressure of the saturated vapor of these impurities produced by throttling only from within flask 14. As the temperature of the remaining liquefied impurities corresponds to the partial saturated vapor pressure of these impurities, any heat leak would thus raise the lowest possible temperature.

Coils 10 in the outer annular compartment are so connected that the impure helium flows down through these coils and thus comes into indirect contact with the liquid impurities cooled to the lowest possible temperature within the inner annular compartment just before the impure helium passes to mist collector D and thence to flask 14. Consequently, the impure helium is cooled to a temperature closely approaching the lowest possible temperature in the system before separation of the liquefied impurities occurs.

The purity reached by the helium is determined by the temperature to which it is thus cooled in combination with the effectiveness of separation of the liquefied impurities from the helium remaining as a gas.

I claim:

1. An apparatus for purifying a gas by selective liquefaction comprising means for cooling the gas until a mist of impurities is produced by selective liquefaction, a mist collector containing a number of layers of wire mesh screen for concentrating into liquid drops the mist of impurities so produced, and a flask in which the said liquid drops are separated from the remaining gas.

2. An apparatus for purifying a gas by selective liquefaction comprising means for cooling the gas until a mist of impurities is produced by selective liquefaction, a mist collector for concentrating into liquid drops the mist of impurities so produced, a flask in which the said liquid drops are separated from the remaining gas, and means for introducing the mixture of liquid drops and remaining gas tangentially into said flask for separation therein by centrifugal force.

3. An apparatus for purifying a gas by selective liquefaction comprising means for cooling the gas until the impurities are liquefied by selective liquefaction, a flask in which the said liquefied impurities are separated from the remaining gas and means for introducing the mixture of liquefied impurities and remaining gas tangentially into said flask for separation therein by centrifugal force.

4. In an apparatus for purifying a compressed gas by selective liquefaction, a mist collector for concentrating into liquid drops the mist of impurities produced by selective liquefaction, a flask in which the liquid drops of liquefied impurities are separated from said gas, an annular compartment surrounding said flask, and means for throttling liquefied impurities from said flask into said annular compartment.

5. In an apparatus for purifying a compressed gas by selective liquefaction, a mist collector for concentrating into liquid drops the mist of impurities produced by selective liquefaction, a flask in which the liquid drops of liquefied impurities are separated from said gas, an annular compartment surrounding said flask, means for throttling liquefied impurities from said flask into said annular compartment, a second annular compartment surrounding the first mentioned annular compartment, and means for admitting the liquefied impurities from the first into the second annular compartment.

6. In an apparatus for purifying a compressed gas by selective liquefaction, a mist collector for concentrating into liquid drops the mist of impurities produced by selective liquefaction, a flask in which the liquid drops of liquefied impurities are separated from said gas, an annular compartment surrounding said flask, means for throttling liquefied impurities from said flask into said annular compartment, a second annular compartment surrounding the first mentioned annular compartment, means for admitting the liquefied impurities from the first into the second annular compartment, and tubes for conveying the said compressed gas through the liquefied impurities in the second annular compartment before passing the compressed gas through the said mist collector.

7. In an apparatus for purifying a compressed gas by selective liquefaction, a mist collector for concentrating into liquid drops the mist of impurities produced by selective liquefaction, a flask in which the liquid drops of liquefied impurities are separated from said gas, a compartment and means for throttling liquefied impurities from said flask into said compartment wherein absorbed gas released and liquid vaporized by throttling are separated from remaining liquefied impurities, a second compartment and means for admitting the remaining liquefied impurities from the first into the second compartment, and tubes for conveying the said compressed gas through the remaining liquefied impurities in the second compartment before passing the compressed gas through the mist collector.

8. In an apparatus for purifying a compressed gas by selective liquefaction, a flask into which the said gas containing liquefied impurities is introduced tangentially in order to deposit the said liquefied impurities by centrifugal force upon the inner walls of the said flask, an annular compartment surrounding said flask and means for throttling liquefied impurities from said flask into said annular compartment.

9. In an apparatus for purifying a compressed gas by selective liquefaction, a flask into which the said gas containing liquefied impurities is introduced tangentially in order to deposit the said liquefied impurities by centrifugal force upon the inner walls of the said flask, an annular compartment surrounding said flask, means for throttling liquefied impurities from said flask into said annular compartment, a second annular compartment surrounding the first mentioned annular compartment, and means for admitting the liquefied impurities from the first into the second annular compartment.

10. In an apparatus for purifying a compressed gas by selective liquefaction, a flask into which the said gas containing liquefied impurities is introduced tangentially in order to deposit the said liquefied impurities by centrifugal force upon the inner walls of the said flask, an annular compartment surrounding said flask, means for throttling liquefied impurities from the said flask into said annular compartment, a second annular compartment surrounding the first mentioned annular compartment, means for admitting the liquefied impurities from the first into the second annular compartment, and tubes for conveying the said compressed gas through the liquefied impurities in the second annular compartment before passing the said gas into the said flask.

11. In an apparatus for purifying a compressed gas by selective liquefaction, a flask into which the said gas containing liquefied impurities is introduced tangentially in order to deposit the said liquefied impurities by centrifugal force upon the inner walls of the said flask, a compartment and means for throttling liquefied impurities from said flask into said compartment wherein absorbed gas released and liquid vaporized by throttling are separated from remaining liquefied impurities, a second compartment and means for admitting the remaining liquefied impurities from the first into the second compartment, and tubes for conveying the said compressed gas through the remaining liquefied impurities in the second compartment before passing the compressed gas into the said flask.

WILLIAM LANE DE BAUFRE.